United States Patent
Takeuchi et al.

(10) Patent No.: US 7,221,148 B2
(45) Date of Patent: May 22, 2007

(54) WHEEL SPEED SENSOR ASSEMBLY

(75) Inventors: Masakazu Takeuchi, Miyoshi (JP);
Yoshitami Saito, Miyoshi (JP); Fumio Makino, Nagoya (JP)

(73) Assignee: Advics Co., Ltd., Kariya, Aichi (JP)

( * ) Notice: Subject to any disclaimer, the term of this patent is extended or adjusted under 35 U.S.C. 154(b) by 0 days.

(21) Appl. No.: 11/350,935

(22) Filed: Feb. 10, 2006

(65) Prior Publication Data
US 2006/0181269 A1    Aug. 17, 2006

(30) Foreign Application Priority Data
Feb. 15, 2005    (JP) .............................. 2005-037460

(51) Int. Cl.
*G01P 3/48* (2006.01)
(52) U.S. Cl. ..................................... 324/173
(58) Field of Classification Search ................ 324/173
See application file for complete search history.

(56) References Cited

U.S. PATENT DOCUMENTS 5,679,990 A * 10/1997 Ushiro ..................... 310/68 B

FOREIGN PATENT DOCUMENTS

JP    9-329612    12/1997

* cited by examiner

*Primary Examiner*—Reena Aurora
(74) *Attorney, Agent, or Firm*—Buchanan Ingersoll & Rooney PC (57) ABSTRACT

A wheel speed sensor assembly includes a rotor formed with first and second protrusions arranged circumferentially on the outer periphery thereof in two separate rows at an equal angular pitch. The first protrusions are angularly displaced from the respective second protrusions by half the angular pitch of the first or second protrusions. The sensor assembly further includes a senor having two magnetoelectric devices each opposing the first protrusions or second protrusions. With this arrangement, the differential waveform produced by the sensor has a flat stepped portion between any adjacent rising and falling portions of the differential waveform. The flat portions make the rising and falling portions steeper and shorter. Thus, when the sensor vibrates in the rotational direction of the rotor, the differential waveform is less likely to overshoot the upper threshold or undershoot the lower threshold, which in turn prevents abnormal block pulses from being produced. The detection accuracy of the sensor thus improves.

5 Claims, 7 Drawing Sheets

Forward rotation of rotor [deg]

Fig.11B
Prior Art

Reverse rotation of rotor [deg]

WHEEL SPEED SENSOR ASSEMBLY

BACKGROUND OF THE INVENTION

The present invention relates to a wheel speed sensor assembly for detecting the rotational speed of e.g. a vehicle wheel.

Figure 10:
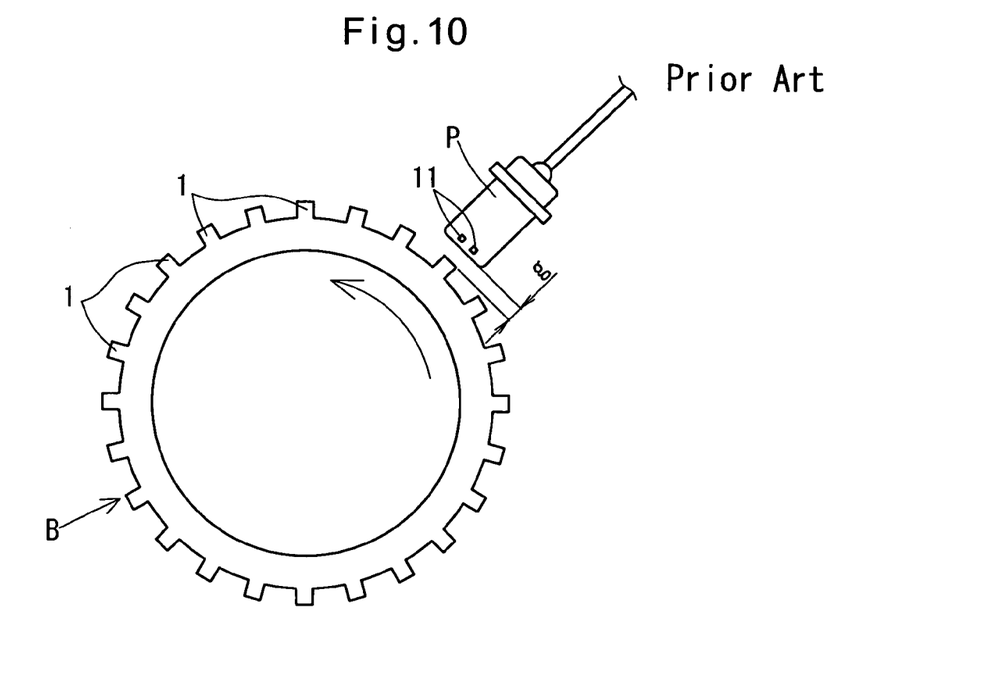
FIG. 10 shows a conventional wheel speed sensor assembly.

Typically, as shown in FIG. 10, a wheel speed sensor P is provided opposite to a rotary member B which rotates together with a wheel. The sensor P picks up fluctuations in the magnetic field due to rotation of the rotary member B, converts such fluctuations to electrical signals and outputs the electrical signals. Typically, the rotary member B is a rotor in the form of a pulse ring made of a ferromagnetic material and having teeth (protrusions) 1 formed on the outer periphery thereof, or a pulse ring having its outer periphery magnetized so that N and S poles appear circumferentially alternating with each other.

As disclosed in JP patent publication 9-329612A, the wheel speed sensor P includes two magnetoelectric devices 11 for picking up fluctuations in the magnetic field and producing waveforms that represent fluctuations picked up by the respective magnetoelectric devices 11. The sensor P further includes a signal processing unit for producing a differential waveform from the waveforms produced by the respective magnetoelectric devices 11, and then producing block pulses from the differential waveform based on upper and lower thresholds. The block pulses thus produced are used to calculate the rotation (rotational speed) of the rotary member B (and thus the wheel on which the rotary member B is mounted).

This wheel speed sensor P further includes a high-pass filter circuit which eliminates variations in the output voltage of the magnetoelectric devices 11 and their changes with temperature, and also reduces the influence of eccentricity of the rotary member B, and the influence of external magnetic field noise, thereby improving the detection accuracy (paragraph [0005] of JP patent publication 9-329612A).

Since the wheel speed sensor P is provided near a vehicle wheel, the distance between the magnetoelectric devices 11 of the wheel speed sensor P and the rotary member (rotor) B tends to change due to severe vibration. This may cause changes in the gradient of the differential waveform, thereby producing abnormal block pulses (paragraphs [0011] to [0014] of the above publication).

Figure 11A:
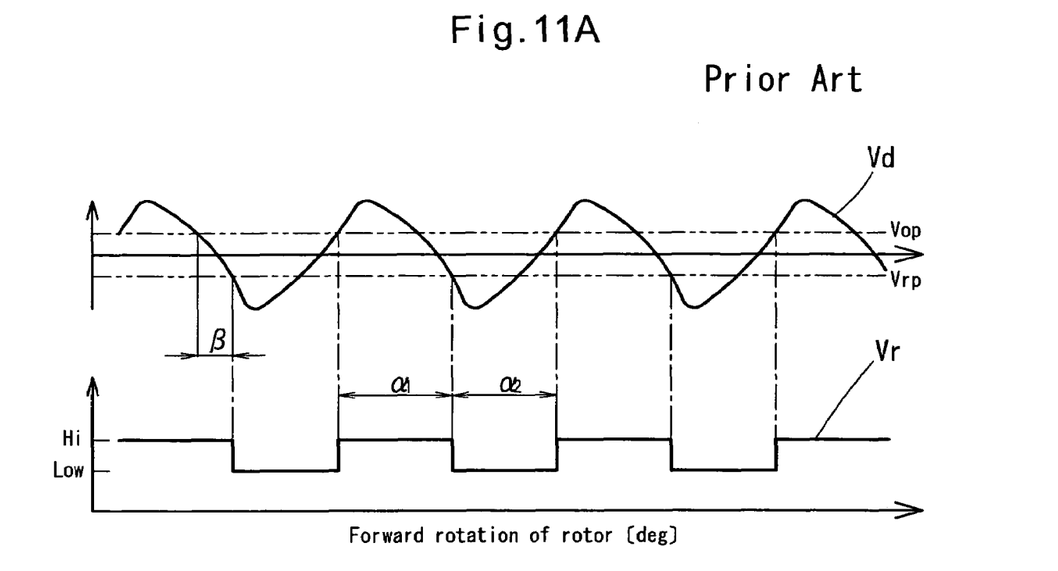
FIGS. 11A and 11B show differential waveforms and block pulses produced from a conventional wheel speed sensor assembly.
Figure 11B:
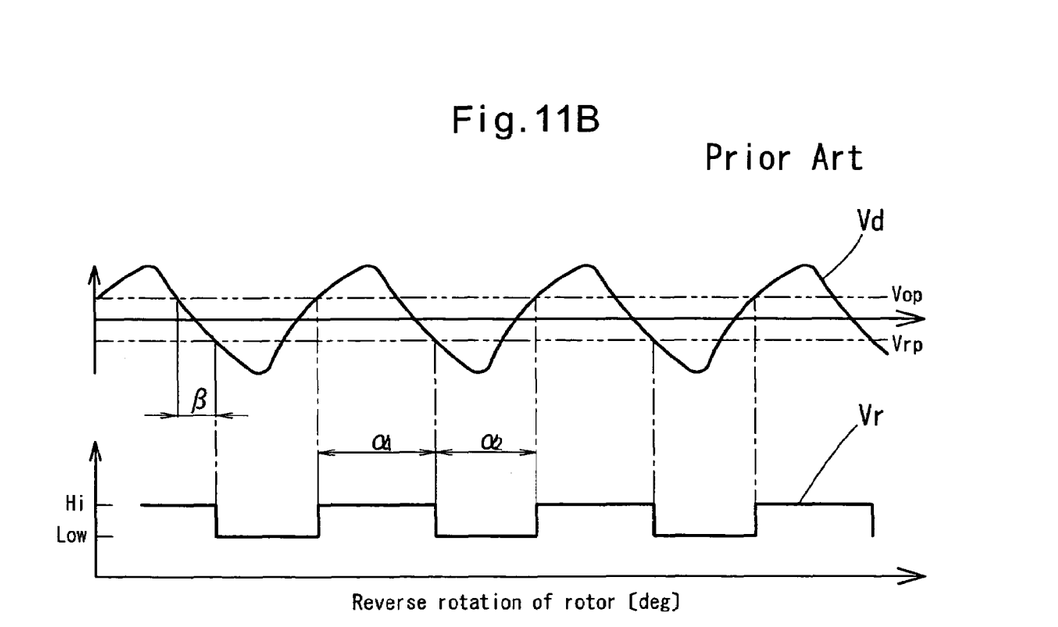

In order to prevent this problem, as shown in FIGS. 11A and 11B, the differential waveform Vd is continuously and sharply changed, thereby increasing its gradient. FIGS. 11A and 11B show the differential waveforms and corresponding block pulses while the rotor B is rotating in forward and backward directions, respectively. By increasing the gradient of the differential waveform, the rising point of each block pulse Vr stabilizes, which in turn improves the detection accuracy. (See paragraphs [0016] to [0022] of the above publication.)

While this publication proposes to minimize the influence of variations in the distance g between the magnetoelectric devices 11 and the rotor B (FIG. 10), the wheel speed sensor P also tends to vibrate in the rotational directions of the rotor B.

As shown in FIGS. 11A and 11B, block pulses Vr comprise high-level signals and low-level signals. When the differential waveform overshoots the upper threshold Vop, changeover from low-level to high-level signals occurs, and when the rotor B rotates by an angle of $\alpha_1$ (degrees) from this position and the differential waveform undershoots the lower threshold Vrp, changeover from high-level to low-level signals occurs. Then, when the rotor B further rotates by an angle of $\alpha_2$ (degrees), the differential waveform again overshoots the upper threshold Vop, so that changeover from low-level to high-level signals occurs again. The rotational speed of the wheel is calculated from the number of pulses per unit time.

If the wheel speed sensor P vibrates in a direction opposite to the rotational direction of the rotor B by an angle greater than the angle $\beta$ (degrees) immediately after the differential waveform has undershot the lower threshold, the differential waveform will instantly overshoot the upper threshold and then soon undershoot the lower threshold again when the sensor P vibrates in the opposite direction. Thus, between adjacent pulses, a small pulse is formed. Conversely, if the wheel speed sensor P vibrates in a direction opposite to the rotational direction by an angle $\beta$ immediately after the differential waveform has overshot the upper threshold, a trough will be formed in a pulse, thus dividing the normal pulse into two abnormal pulses. Thus, every time the sensor P vibrates in the above manner, the number of pulses increases by one compared to the number of normal pulses. This makes accurate detection of the wheel speed difficult. The "normal" pulses herein used refer to pulses each produced when one protrusion (tooth) 1 passes the wheel speed sensor P with the sensor P stationary.

An object of the present invention is to provide a wheel speed sensor assembly which can minimize any harmful influence on the detection accuracy even if the wheel speed sensor vibrates in a direction opposite to the direction in which the rotary member (rotor) B rotates.

SUMMARY OF THE INVENTION

According to the present invention, the differential waveform comprises first portions overshooting an upper threshold, second portions undershooting a lower threshold, and third portions each disposed between one of the first portions and one of the second portions that is adjacent to the one of the first portions, each of the third portions having a stepped portion.

Figure 3A:
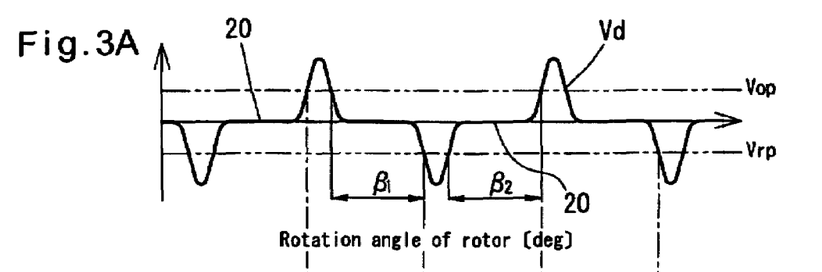
FIGS. 3A and 3B show a differential waveform produced based on the waveforms of FIGS. 2A and 2B, and block pulses produced based on the differential waveform of FIG. 3A, respectively.
Figure 3B:
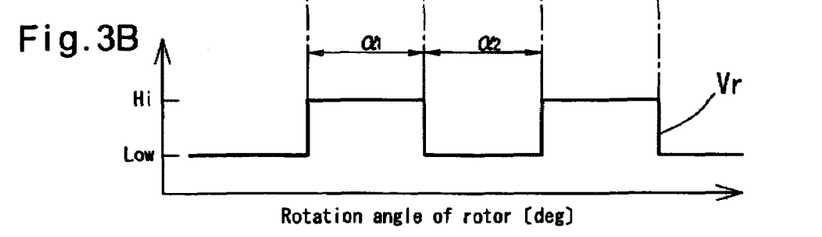

With this arrangement, as long as the range of angular vibration of the sensor P is within the angular range $\beta_1$ or $\beta_2$ in FIG. 3A, no abnormal pulse will be produced between any adjacent normal pulses or no abnormal trough will be formed in any normal pulse.

Since the rising portion and falling portion of the differential waveform on both sides of each stepped portion are steep and short, the stepped portions are relatively long. That is, the angular ranges $\beta_1$ or $\beta_2$ of the stepped portions are so wide as to be close to the angular range $\alpha 1$ of a normal pulse and the angular range $\alpha 2$ of the interval between any two adjacent normal pulses.

According to the present invention, by the provision of the stepped portion between any adjacent overshooting and undershooting portions of the differential waveform, it is possible to dramatically reduce the possibility of any abnormal pulse being produced between any adjacent normal pulses or any abnormal trough being formed in any normal pulse.

According to the present invention, there is provided a wheel speed sensor assembly comprising a rotary member configured to be fixedly mounted on a wheel so as to rotate together with the wheel, the rotary member producing fluctuations in magnetic field when the rotary member rotates together with the wheel, and a wheel speed sensor comprising two magnetoelectric devices for picking up the fluctuations in magnetic field and producing waveforms corresponding to the fluctuations, and a signal processing unit for producing a differential waveform from the waveforms produced by the two magnetoelectric devices, and producing block pulses from the differential waveform based on upper and lower thresholds, the differential waveform comprising first portions overshooting the upper threshold, second portions undershooting the lower threshold, and third portions each disposed between one of the first portions and one of the second portions that is adjacent to the one of the first portions, each of the third portions having a stepped portion.

The stepped portion is preferably a flat portion. By the provision of such a flat portion, the rising portion and falling portion of the differential waveform on both sides of each flat portion become further steep and short, thus further increasing the angular ranges $\beta_1$ and $\beta_2$ to a level nearly equal to the angular ranges $\alpha_1$ and $\alpha_2$. As long as the sensor P vibrates within the angular ranges $\beta_1$ and $\beta_2$, no abnormal pulse or abnormal trough is produced. Thus, by increasing the angular ranges $\beta_1$ and $\beta_2$ to a level nearly equal to the angular ranges $\alpha_1$ and $\alpha_2$, it is possible to further improve the detection accuracy of the wheel speed.

As a specific arrangement for forming such stepped portions in the differential waveform, there is provided a sensor assembly wherein the rotary member includes first and second protrusions or recesses arranged circumferentially on an outer periphery thereof in two separate rows over the entire circumference at an equal angular pitch, the first protrusions or recesses being angularly displaced from the respective second protrusions or recesses by half the angular pitch of the first and second protrusions or recesses, the first and second protrusions or recesses producing the fluctuations in magnetic field, the two magnetoelectric devices being aligned with each other in a direction transverse to the rows of the first and second protrusions or recesses.

The circumferential dimension of each of the first and second protrusions or recesses should be as small as possible compared to the intervals between the adjacent first and second protrusions or recesses. This is because the smaller this dimension, the greater the circumferential dimensions of the stepped portions of the differential waveform and thus the angular ranges $\beta_1$ and $\beta_2$. This will reduce the possibility of abnormal block pulses being produced due to angular vibration of the sensor.

Preferably, the first protrusions or recesses overlap with the second protrusions or recesses as viewed from a circumferential direction of the rotary member.

Figure 2A:
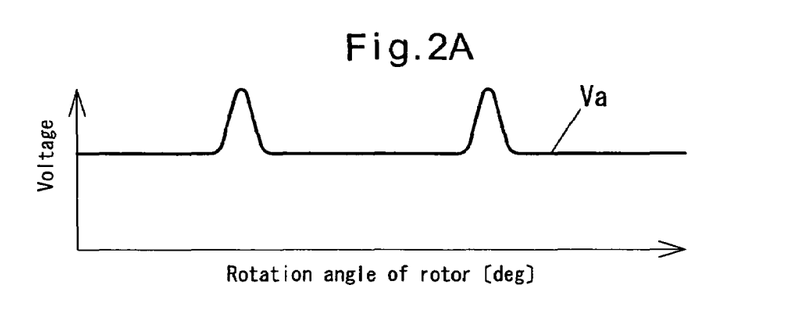
FIGS. 2A and 2B show waveforms produced from a pair of magnetoelectric devices of the embodiment of FIG. 1, respectively.
Figure 2B:
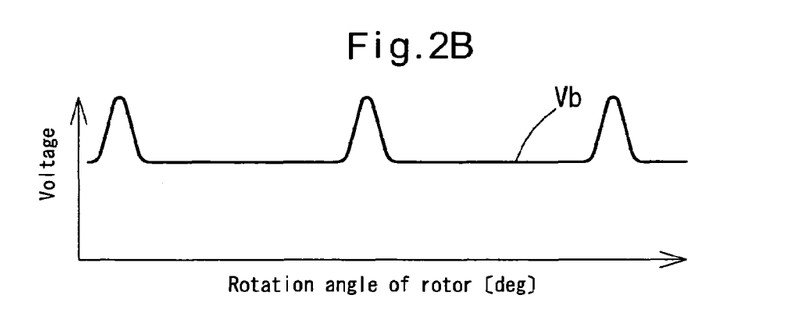
Figure 6A:
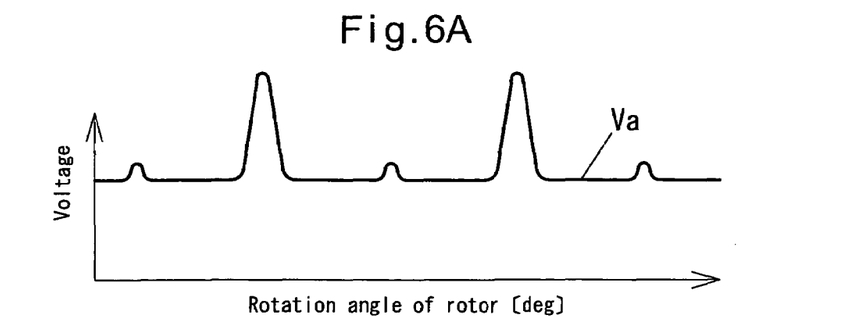
FIGS. 6A and 6B show waveforms produced from a pair of magnetoelectric devices of the embodiment of FIG. 5, respectively.
Figure 6B:
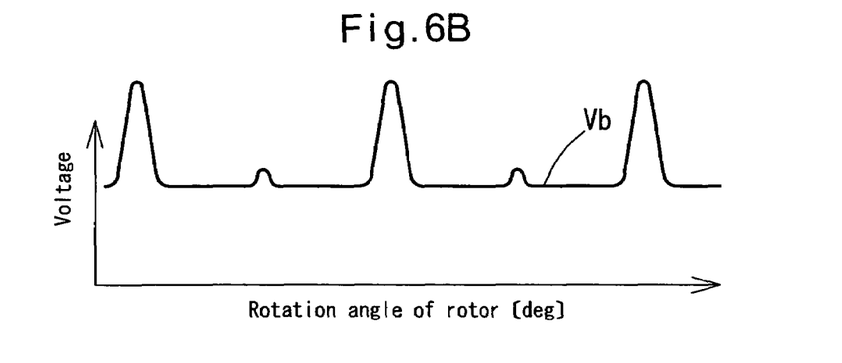
Figure 7A:
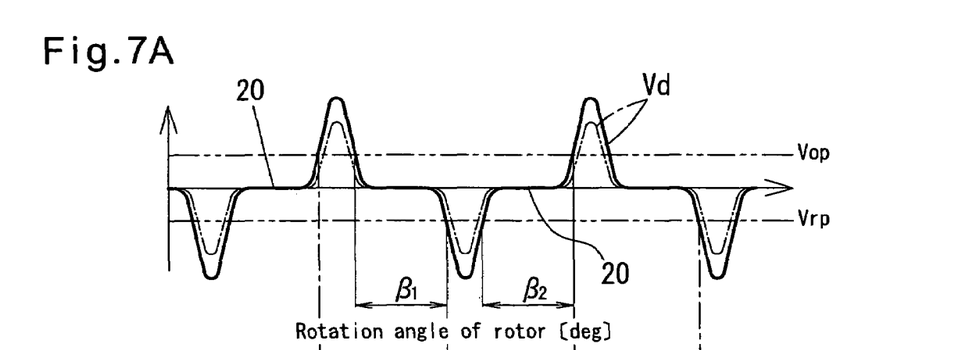
FIGS. 7A and 7B show a differential waveform produced based on the waveforms of FIGS. 6A and 6B, and block pulses produced based on the differential waveform of FIG. 7A, respectively.
Figure 7B:
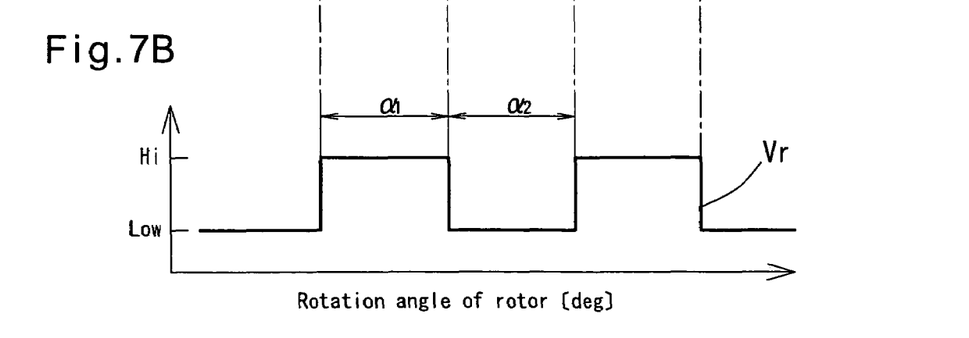

With this arrangement, as shown in FIG. 6, when the respective magnetoelectric devices pass over the protrusions or recesses corresponding thereto, the peak values of the waveform produced is higher than the peak values of the waveforms shown in FIGS. 2A and 2B by an amount greater than the peak values of the waveform produced by the respective magnetoelectric devices when they pass over the protrusions or recesses not corresponding to the respective magnetoelectric devices. Thus, as shown in FIG. 7A, the differential waveform when the first and second protrusions or recesses overlap with each other (solid line) has higher peaks and deeper troughs than the differential waveform when the first and second protrusions or recesses do not overlap with each other (one-dot chain line). That is, the former has steeper-rising and falling portions than the latter. The degree of overlapping should therefore be determined taking into consideration the desired height and depth of the peaks and troughs of the differential waveform.

For the same purpose, instead of angularly displacing the first protrusions or recesses from the second protrusions or recesses, the magnetoelectric devices may be angularly displaced from each other. Specifically, in this arrangement, the rotary member includes protrusions or recesses arranged circumferentially on an outer periphery thereof in a single row over the entire circumference at an equal angular pitch, the protrusions or recesses producing the fluctuations in magnetic field, one of the two magnetoelectric devices being angularly displaced from the other of the two magnetoelectric devices by half the angular pitch of the first and second protrusions or recesses, whereby the stepped portions are produced.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

FIGS. 1 to 4 show the first embodiment, which includes a rotor B made of a magnetic material and fixedly mounted on a wheel of a vehicle so as to rotate together with the wheel. The rotor B is formed with first and second protrusions 1a and 1b on the outer periphery thereof in two separate rows at an equal angular pitch t. The first protrusions 1a are angularly displaced from the respective second protrusions 1b by half the angular pitch t.

Figure 1:
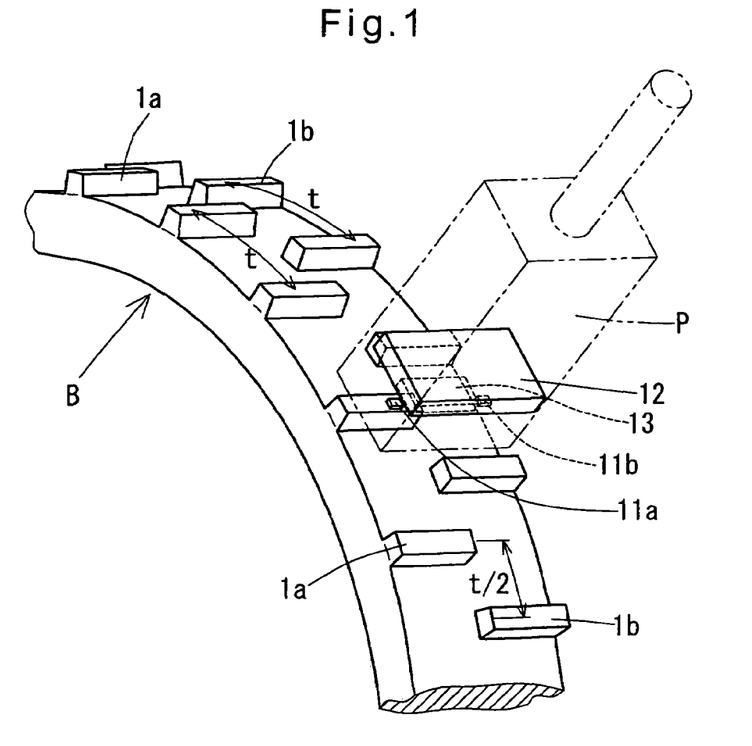
FIG. 1 is a partial perspective view of an embodiment according to the present invention.

Opposite the outer periphery of the rotor B, the wheel speed sensor P is fixed to e.g. an axle of the vehicle. The wheel speed sensor P includes two Hall elements 11a and 11b as magnetoelectric devices, a magnet 12 and a signal processing circuit 13. When the rotor B rotates, the magnetic flux of the magnet 12 fluctuates because the protrusions and the troughs therebetween pass alternately in front of the sensor P. The Hall elements 11a and 11b pick up such fluctuations in the magnetic flux, thus producing voltage waveforms Va and Vb, respectively, as shown in FIGS. 2A and 2B.

Figure 4A:
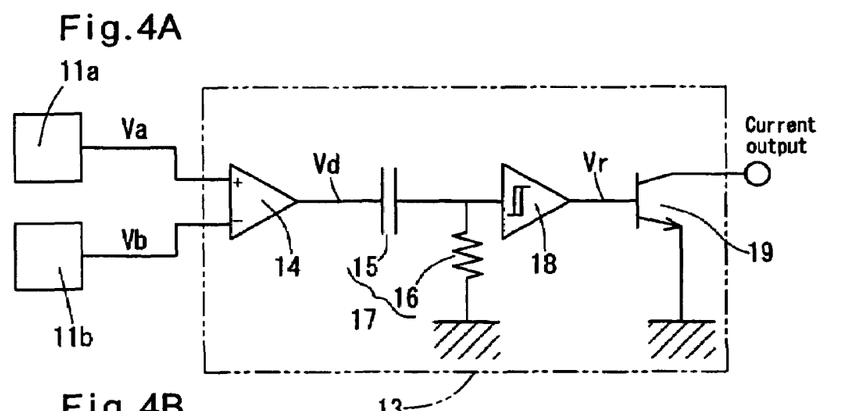
FIGS. 4A and 4B show two different signal processing circuits.
Figure 4B:
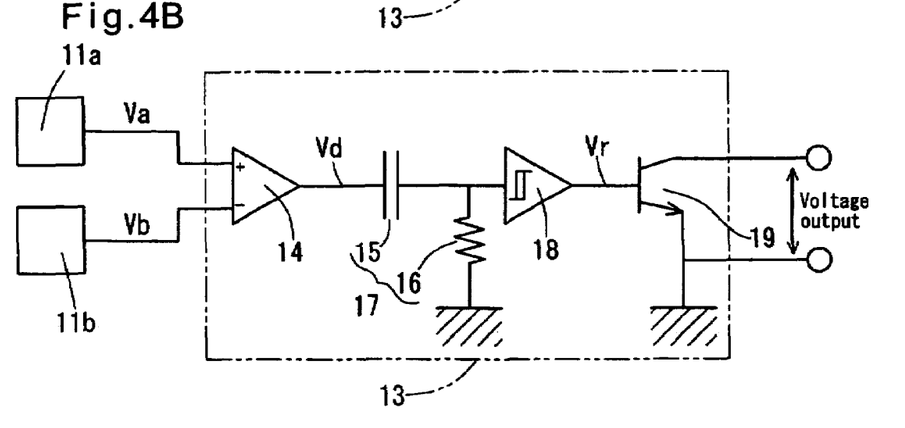

Two different signal processing circuits 13 are shown in FIGS. 4A and 4B, respectively. The signal processing circuit 13 of FIG. 4A produces a current output. In this arrangement, the waveforms Va and Vb from the Hall elements 11a and 11b are entered into a differential amplifier 14, which produces the differential waveform Vd based on the waveforms Va and Vb. The differential waveform Vd passes through a high pass filter circuit 17 comprising a capacitor 15 and a resistor 16, is converted to block pulses Vr in a Schmidt trigger circuit 18, and produced as open collector outputs. The signal processing circuit of FIG. 4B produces a voltage output and differs from the signal processing circuit of FIG. 4A in the structure of the output circuit.

When the differential waveform Vd passes through the high pass filter, any components that have changed due to variations in voltage and/or temperature are removed and only its alternating components are taken out. This reduces the influence of eccentricity of the rotor and external magnetic field noise.

Since the first and second protrusions 1a and 1b are arranged in two separate rows with the first protrusions 1a angularly displaced from the respective second protrusions 1b by half the angular pitch of the protrusions 1a or 1b, a flat stepped portion 20 is formed in the differential waveform Vd between any adjacent peak and trough of the differential waveform (see FIG. 3A).

By providing the differential waveform Vd with such flat stepped portions 20, its rising portion (i.e. portion overshooting an upper threshold Vop) and falling portion (portion undershooting a lower threshold Vrp) on both sides of each stepped portion 20 will become shorter and steeper, so that the angular ranges $\beta_1$ and $\beta_2$ within which the differential waveform neither overshoot the upper threshold. Vop nor undershoot the lower threshold Vrp will be close to the angular range $\alpha_1$ of each normal pulse of the block pulses shown in FIG. 3B and the angular range $\alpha_2$ of the interval between any adjacent normal pulses. Thus, even if the sensor P vibrates in the rotational direction of the rotor B, abnormal pulses are less likely to be produced.

Figure 5:
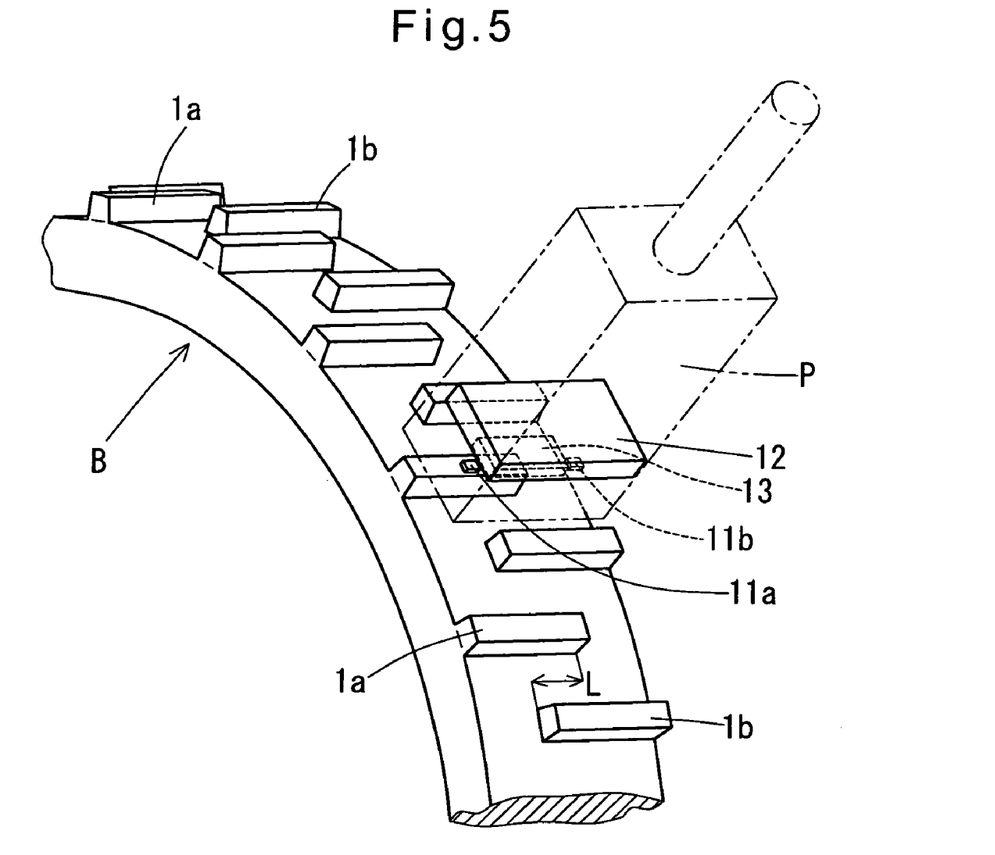
FIG. 5 is a partial perspective view of another embodiment according to the present invention.

In this embodiment, the first and second protrusions 1a and 1b may be arranged so as to overlap with each other as viewed from the circumferential direction of the rotor B by an amount of L (see FIG. 5). The value of L should be determined taking into consideration the desired gradient of the rising and falling portions of the differential waveform Vd. For example, the overlapping amount L may be 1 mm if the rotor B is 5 mm wide and the first and second protrusions 1a and 1b are 3 mm wide.

By arranging the first and second protrusions 1a and 1b so as to overlap with each other in the above manner, as shown in FIGS. 6A and 6B, when the respective magnetoelectric devices 11a and 11b pass over the protrusions 1a and 1b corresponding thereto, the peak values of the waveform produced is higher than the peak values of the waveforms shown in FIGS. 2A and 2B by an amount greater than the peak values of the waveform produced by the respective magnetoelectric devices when they pass over the protrusions not corresponding to the respective magnetoelectric devices.

Thus, as shown in FIG. 7A, the differential waveform when the protrusions 1a and 1b overlap with each other (solid line) has higher peaks and deeper troughs than the differential waveform when the protrusions 1a and 1b do not overlap with each other (one-dot chain line). That is, the former has steeper rising and falling portions than the latter.

With this arrangement, because the angular ranges $\beta_1$ and $\beta_2$ are so wide as to be close to the angular ranges $\alpha_1$ and $\alpha_2$, the differential waveform is less likely to overshoot the upper threshold or undershoot the lower threshold due to vibration of the sensor P in the rotational direction of the rotor B.

Figure 8A:
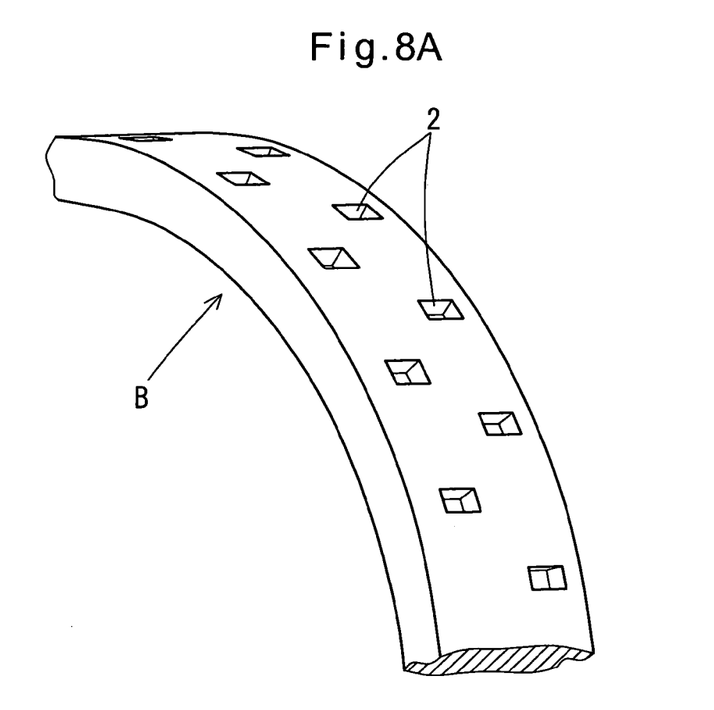
FIGS. 8A, 8B and 9 are partial perspective views of other embodiments according to the present invention.
Figure 8B:
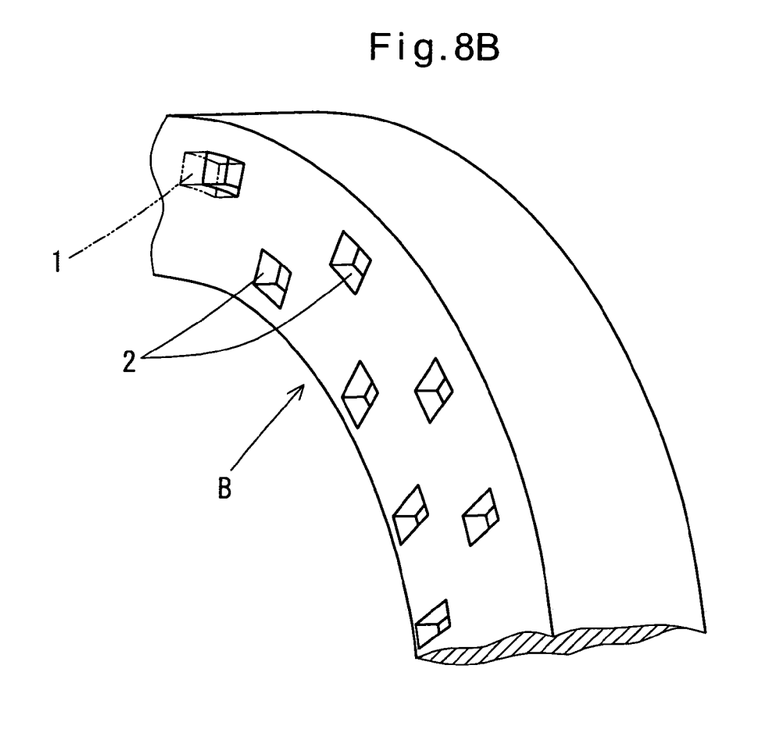

As shown in FIG. 8A, the protrusions 1a and 1b may be replaced with recesses 2 such as dents or holes. Also, as shown in FIG. 8B, such protrusions 1a, 1b or recesses 2 may be provided on one end surface of the rotor B.

Further, instead of the rotor B of the embodiment, a pulse ring may be used which includes, instead of the protrusions 1a and 1b, N and S poles provided circumferentially alternating with each other.

Figure 9:
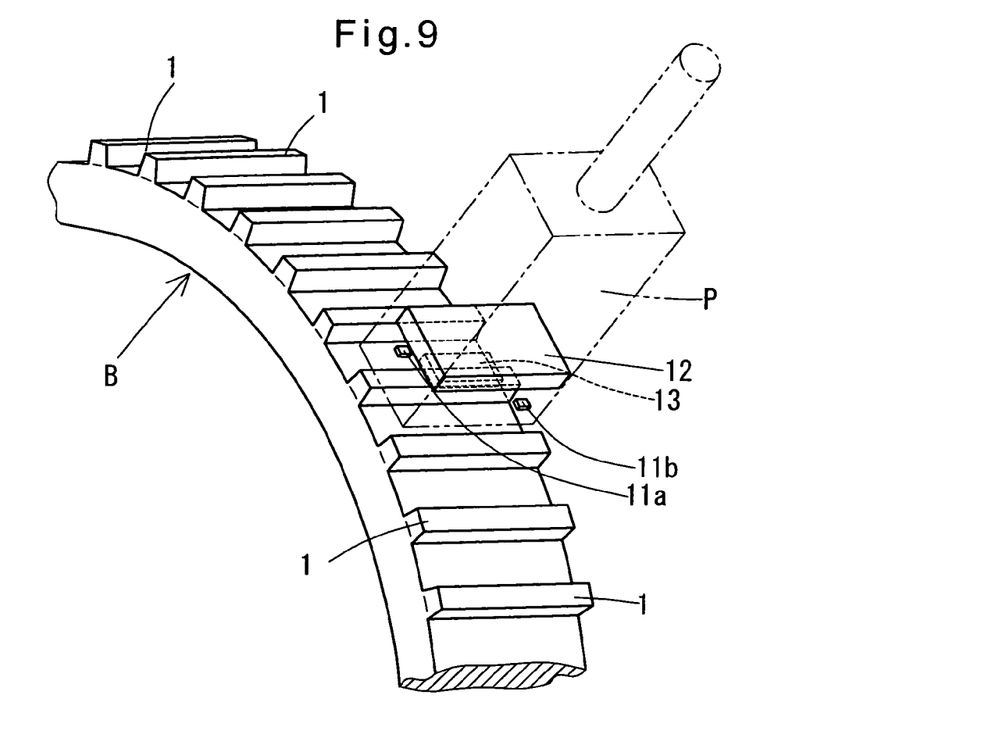

For the same purpose, instead of angularly displacing the first protrusions or recesses from the second protrusions or recesses, the magnetoelectric devices may be angularly displaced from each other as shown in FIG. 9. Specifically, in this arrangement, the rotary member includes protrusions 1a or 1b or recesses 2 arranged circumferentially on an outer periphery thereof in a single row over the entire circumference at an equal angular pitch t, with the magnetoelectric devices 11a and 11b angularly displaced from each other by half the angular pitch t. In this case, the magnetoelectric devices 11a 11b do not necessarily have to be displaced from each other in the width direction of the rotor B.

The magnetoelectric devices may not be Hall elements but maybe magnetoresistive elements or other equivalents such as pickups having coils.

The signal processing circuit 13 may be provided outside of the wheel speed sensor P.

What is claimed is:

1. A wheel speed sensor assembly comprising a rotary member configured to be fixedly mounted on a wheel so as to rotate together with the wheel, said rotary member producing fluctuations in magnetic field when said rotary member rotates together with the wheel, and a wheel speed sensor comprising two magnetoelectric devices for picking up said fluctuations in magnetic field and producing waveforms corresponding to said fluctuations, and a signal processing unit for producing a differential waveform from said waveforms produced by said two magnetoelectric devices, and producing block pulses from said differential waveform based on upper and lower thresholds, said differential waveform comprising first portions overshooting said upper threshold, second portions overshooting said upper threshold and arranged alternately with said first portions, third portions undershooting said lower threshold and each provided between an adjacent pair of said first and second portions, each of said third portions connecting with the adjacent pair of said first and second portions through fourth and fifth stepped portions, respectively.

2. The wheel speed sensor assembly of claim 1 wherein said stepped portion is a flat portion.

3. The wheel speed sensor assembly of claim 1 wherein said rotary member includes protrusions or recesses arranged circumferentially on an outer periphery thereof in a single row over the entire circumference at an equal angular pitch, said protrusions or recesses producing said fluctuations in magnetic field, one of said two magnetoelectric devices being angularly displaced from the other of said two magnetoelectric devices by half said angular pitch, whereby said stepped portions are produced.

4. A wheel speed sensor assembly comprising a rotary member configured to be fixedly mounted on a wheel so as to rotate together with the wheel, said rotary member producing fluctuations in a magnetic field when said rotary member rotates together with the wheel, and a wheel speed sensor comprising two magnetoelectric devices for picking up said fluctuations in the magnetic field and producing waveforms corresponding to said fluctuations, and a signal processing unit for producing a differential waveform from said waveforms produced by said two magnetoelectric devices, and producing block pulses from said differential waveform based on upper and lower thresholds, said differential waveform comprising first portions overshooting said upper threshold, second portions undershooting said lower threshold, and third portions each disposed between one of said first portions and one of said second portions that is adjacent to said one of said first portions, each of said third portions having a stepped portion, wherein said rotary member includes first and second protrusions or recesses arranged circumferentially on an outer periphery thereof in two separate rows over the entire circumference at an equal angular pitch, said first protrusions or recesses being angularly displaced from the respective second protrusions or recesses by half said angular pitch, said first and second protrusions or recesses producing said fluctuations in the magnetic field, said two magnetoelectric devices being aligned with each other in a direction transverse to said rows of said first and second protrusions or recesses, whereby said stepped portions are produced.

5. The wheel speed sensor assembly of claim 4 wherein said first protrusions or recesses overlap with said second protrusions or recesses as viewed from a circumferential direction of said rotary member.

* * * * *